(12) United States Patent
Lee et al.

(10) Patent No.: US 10,754,386 B2
(45) Date of Patent: Aug. 25, 2020

(54) ELECTRONIC DEVICE INCLUDING FLEXIBLE DISPLAY

(71) Applicant: Samsung Electronics Co., Ltd., Gyeonggi-do (KR)

(72) Inventors: Sungho Lee, Gyeonggi-do (KR); Jungchul An, Gyeonggi-do (KR); Hanchul Jung, Gyeonggi-do (KR); Youngin Choi, Gyeonggi-do (KR); Donghyun Yeom, Gyeonggi-do (KR); Minwoo Yoo, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/379,385

(22) Filed: Apr. 9, 2019

(65) Prior Publication Data

US 2019/0310686 A1 Oct. 10, 2019

(30) Foreign Application Priority Data

Apr. 9, 2018 (KR) .......................... 10-2018-0041023

(51) Int. Cl.
*G06F 1/16* (2006.01)
*H04M 1/02* (2006.01)
*H04M 1/03* (2006.01)

(52) U.S. Cl.
CPC .......... *G06F 1/1652* (2013.01); *G06F 1/1626* (2013.01); *H04M 1/0268* (2013.01); *H04M 1/03* (2013.01)

(58) Field of Classification Search
None
See application file for complete search history.

(56) References Cited

U.S. PATENT DOCUMENTS 8,305,348 B2 * 11/2012 Shin ...................... G06F 1/1624
345/168
9,817,443 B2 * 11/2017 Kim ...................... G06F 1/1652
(Continued)

FOREIGN PATENT DOCUMENTS

JP 2014072884 4/2014
KR 1020150099668 9/2015
(Continued)

OTHER PUBLICATIONS

International Search Report dated Jul. 17, 2019 issued in counterpart application No. PCT/KR2019/004036, 8 pages.

*Primary Examiner* — Xanthia C Cunningham
(74) *Attorney, Agent, or Firm* — The Farrell Law Firm, P.C.

(57) ABSTRACT

An electronic device is provided, which includes an expanding flexible display. The electronic device includes a first structure including a first face facing a first direction and a second face facing a second direction opposite to the first direction; a second structure that encloses at least a part of the first structure, and configured to guide a sliding movement of the first structure in a direction parallel to the first face or the second face of the first structure; a flexible display including a first region mounted on the first face of the first structure and a second region, which is different from the first region, the second region configured to be accommodated in the second structure or exposed to a first face of the second structure depending on the sliding movement of the first structure; and a first electronic component inside the second structure and exposed through a second face of the second structure, the second face of the second structure facing the second direction and facing away from a first face of the second structure. The flexible display includes an overlapping region at a portion of the flexible (Continued)

display that overlaps a region in which the first electronic component is disposed.

20 Claims, 11 Drawing Sheets

(56) References Cited

U.S. PATENT DOCUMENTS

| | | | |
|---|---|---|---|
| 10,061,358 B2* | 8/2018 | Lee | H04M 1/0237 |
| 2014/0191952 A1* | 7/2014 | Myers | G06F 1/1633 |
| | | | 345/156 |
| 2014/0194165 A1* | 7/2014 | Hwang | G06F 1/1652 |
| | | | 455/566 |
| 2015/0169006 A1* | 6/2015 | Chong | G09G 3/20 |
| | | | 345/173 |
| 2015/0229844 A1* | 8/2015 | Yamazaki | H04N 5/2252 |
| | | | 348/333.01 |
| 2016/0116944 A1 | 4/2016 | Lee et al. | |
| 2016/0202781 A1 | 7/2016 | Kim et al. | |
| 2016/0274718 A1* | 9/2016 | Burr | G06F 1/1643 |
| 2017/0140504 A1 | 5/2017 | Jeong et al. | |
| 2017/0154609 A1 | 6/2017 | Yoon et al. | |
| 2017/0222178 A1 | 6/2017 | Kang et al. | |
| 2017/0310799 A1* | 10/2017 | Lin | G06F 1/1652 |
| 2018/0129246 A1 | 5/2018 | Ko | |

FOREIGN PATENT DOCUMENTS

| | | |
|---|---|---|
| KR | 1020160087460 | 7/2016 |
| KR | 10-1714902 | 3/2017 |

* cited by examiner

ELECTRONIC DEVICE INCLUDING FLEXIBLE DISPLAY

CROSS-REFERENCE TO RELATED APPLICATION(S)

This application is based on and claims priority under 35 U.S.C. § 119 to Korean Patent Application Serial No. 10-2018-0041023, filed on Apr. 9, 2018, in the Korean Intellectual Property Office, the entire disclosure of which is incorporated herein by reference.

BACKGROUND

1. Field

The present disclosure relates generally to an electronic device, and more particularly to an electronic device including a flexible display.

2. Description of Related Art

As the demand for mobile communication increases and the degree of integration of electronic devices increases, it is becoming more convenient to use multimedia functions and the like in electronic devices, such as mobile communication terminals. For example, as a traditional mechanical (button-type) keypad of an electronic device is replaced by a touch screen display, a larger screen may be included in the electronic device. A touch screen display improves the portability of the electronic device while maintaining, if not improving, usability in inputting characters or the like.

When web surfing or using multimedia functions, it is often more convenient to use an electronic device including a relatively larger display. However, considering the importance of portability of the electronic device, there may be restrictions on increasing the size of the display.

A display using an organic light-emitting diode (OLED) or the like may provide portability of an electronic device along with a larger screen. For example, a display using an OLED (or an electronic device equipped with the OLED display) may provide a stable operation even if made very thin, and thus, the OLED display may be mounted on an electronic device in flexible form, e.g., a foldable, bendable, or a rollable form.

A flexible display may be partially accommodated inside an electronic device, and may be expanded according to a user's need. For example, when a flexible display displays a screen having an aspect ratio of 16:9 while accommodated in an electronic device, when the screen display region is expanded, a screen having an aspect ratio of 18:9 or 21:9 may be output.

In the flexible display, the region accommodated inside the electronic device or selectively exposed to the outside may be flexible. For example, the region exposed to the outside may have a generally flat shape, but in the process of being accommodated inside the electronic device, a part of the flexible display may be deformed into a curved shape, and the region located inside the electronic device may be disposed substantially parallel to another region exposed to the outside.

However, in a relatively smaller electronic device, which provides greater portability, it may be difficult to provide a region (or a space) capable of accommodating a portion of a flexible display. For example, a flexible display may be partially accommodated in an electronic device and may be extracted as needed in order to expand a screen display region. However, it may be difficult to provide a space capable of avoiding interference with other structures inside the electronic device.

During the accommodation or extraction operation, the flexible display may be damaged when the flexible display mechanically interferes with other structures. In a partially accommodated state, the flexible display may overlap a path through which light is incident on an electronic component, such as an optical sensor (e.g., an image sensor, a proximity sensor, or an illuminance sensor), and thus, may interfere with the operation of the optical sensor.

SUMMARY

The present disclosure has been made to address at least the disadvantages described above and to provide at least the advantages described below.

An aspect of the present disclosure is to provide an electronic device including a flexible display that may be at least partially accommodated inside the electronic device or extracted from the electronic device in order to expand and expose additional screen area.

In accordance with an aspect of the present disclosure, an electronic device is provided, which includes a first structure including a first face and a second face facing away from the first face; a second structure coupled to enclose at least a part of the first structure, and configured to guide a slide movement of the first structure in a direction parallel to the first face or the second face of the first structure; a flexible display having a first region mounted on the first face of the first structure and a second region different from the first region, the second region being inserted into or accommodated in the second structure or exposed to a first face of the second structure in an upper end portion of the second structure depending on the slide movement of the first structure; and a first electronic component mounted inside the second structure and exposed to the outside in a second face of the second structure, which faces away from the first face of the second structure. Within the second structure, a portion of the flexible display (hereinafter, referred to as an "overlapping region") may be disposed to overlap a region in which the first electronic component is disposed.

In accordance with another aspect of the present disclosure, an electronic device is provided, which includes a first structure including a first face and a second face facing away from the first face; a second structure coupled to enclose at least a part of the first structure to at least partially accommodate the first structure therein, and configured to guide a slide movement of the first structure in a direction parallel to the first face or the second face of the first structure; a flexible display having a first region mounted on the first face of the first structure and a second region different from the first region, the second region being inserted into or accommodated in the second structure or exposed to a first face of the second structure in an upper end portion of the second structure depending on the slide movement of the first structure; and an image sensor mounted inside the second structure and exposed to the outside in a second face of the second structure, which faces away from the first face of the second structure. A portion (hereinafter, referred to as an "overlapping region") of the flexible display is disposed between the image sensor and the second face of the second structure.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figure 1:
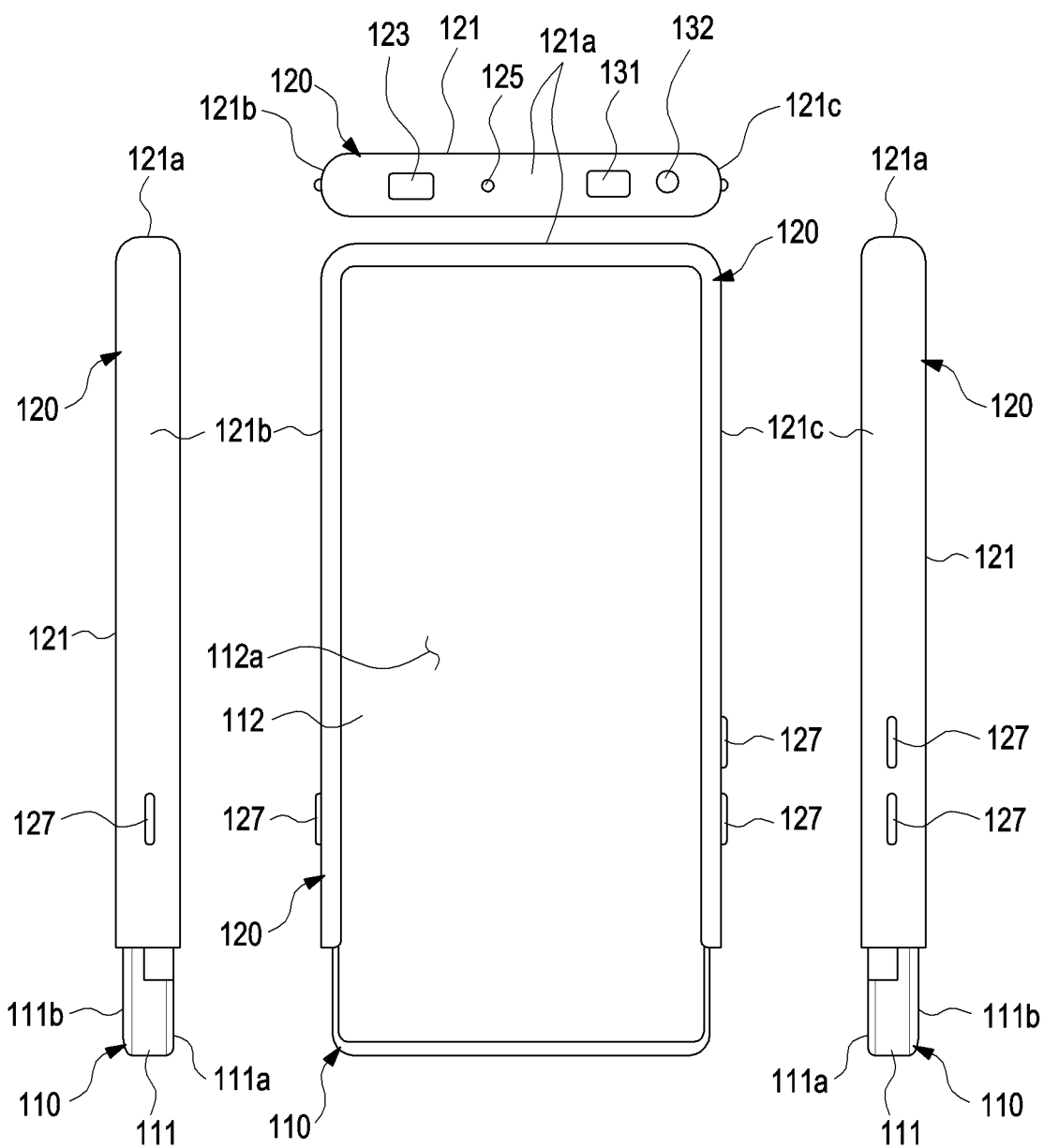
FIG. 1 illustrates a closed state of an electronic device according to an embodiment.

Various embodiments of the present disclosure will now be described in detail with reference to the accompanying drawings. In the following description, specific details such as detailed configuration and components are merely provided to assist the overall understanding of these embodiments. Therefore, it should be apparent to those skilled in the art that various changes and modifications of the embodiments described herein can be made without departing from the scope and spirit of the present disclosure.

In addition, descriptions of well-known functions and constructions are omitted for clarity and conciseness.

Although ordinal terms, such as "first" and "second," may be used to describe various elements, these elements are not limited by these terms. Instead, the ordinal terms are used to distinguish an element from another element. For example, a first element could be referred to as a second element, and similarly, a second element could be also referred to as a first element, without departing from the scope of the disclosure.

As used herein, the term "and/or" includes any and all combinations of one or more associated items.

Further, relative terms, such as "a front surface," "a rear surface," "a top surface," "a bottom surface," etc., which are described with respect to an orientation in a drawing may be replaced by ordinal numbers, such as first and second.

Herein, singular forms are intended to include plural forms as well, unless the context clearly indicates otherwise.

The terms "include" or "have" indicate the existence of a feature, a number, a step, an operation, a structural element, parts, or a combination thereof, and do not exclude the existence or probability of additional features, numeral, steps, operations, structural elements, parts, or combinations thereof.

Unless defined differently, all terms used herein, which include technical terminologies or scientific terminologies, have the same meanings as understood by a person skilled in the art to which the disclosure belongs. Terms such as those defined in a generally used dictionary are to be interpreted to have meanings that are consistent with the contextual meanings in the relevant field of art, and are not to be interpreted to have ideal or excessively formal meanings, unless clearly defined as such in the specification.

In the disclosure, an electronic device may be a terminal, a portable terminal, a mobile terminal, a communication terminal, a portable communication terminal, a portable mobile terminal, a touch screen, etc.

The electronic device may be a smartphone, a portable phone, a game player, a television (TV), a display unit, a heads-up display unit for a vehicle, a notebook computer, a laptop computer, a tablet personal computer (PC), a personal media player (PMP), a personal digital assistant (PDA), etc.

The electronic device may be implemented as a portable communication terminal, which has a wireless communication function and a pocket size. Further, the electronic device may be a flexible device or a flexible display device.

The electronic device may communicate with an external electronic device, such as a server, or perform an operation through an interworking with the external electronic device. For example, the electronic device may transmit an image photographed by a camera and/or position information detected by a sensor to the server through a network.

The network may be a mobile or cellular communication network, a local area network (LAN), a wireless LAN (WLAN), a wide area network (WAN), an Internet, or a small area network (SAN), but is not limited thereto.

Figure 2:
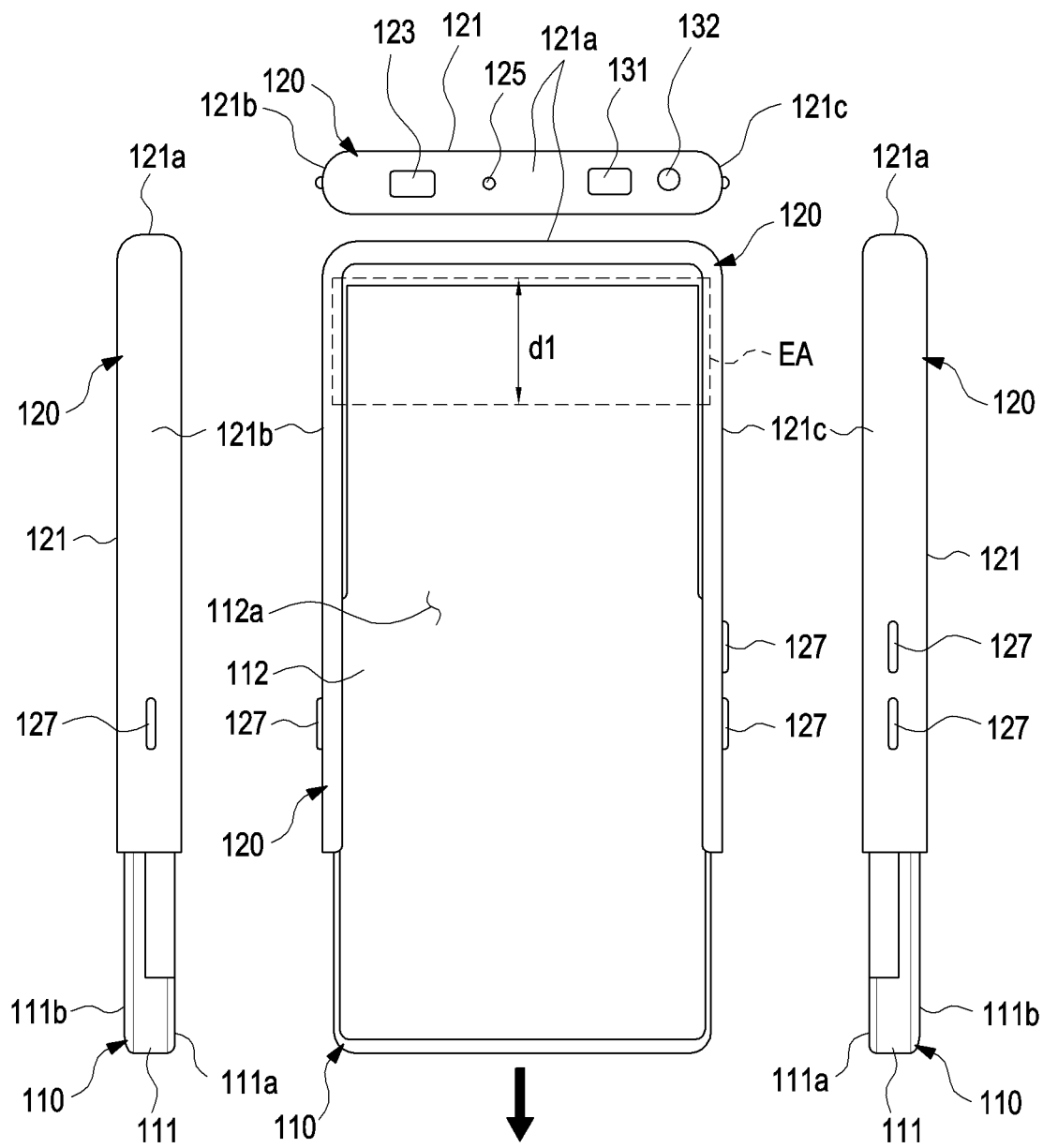
FIG. 2 illustrates an open state of an electronic device according to an embodiment.

FIG. 1 illustrates a closed state of an electronic device according to an embodiment. FIG. 2 illustrates an open state of an electronic device according to an embodiment.

More specifically, FIG. 1 illustrates the closed (or partially open) state of a first structure 110 (e.g., a slide housing) in relation to a second structure 120 (e.g., a guide housing), and FIG. 2 illustrates the open state of the first structure 110 in relation to the second structure 120.

Figure 3:
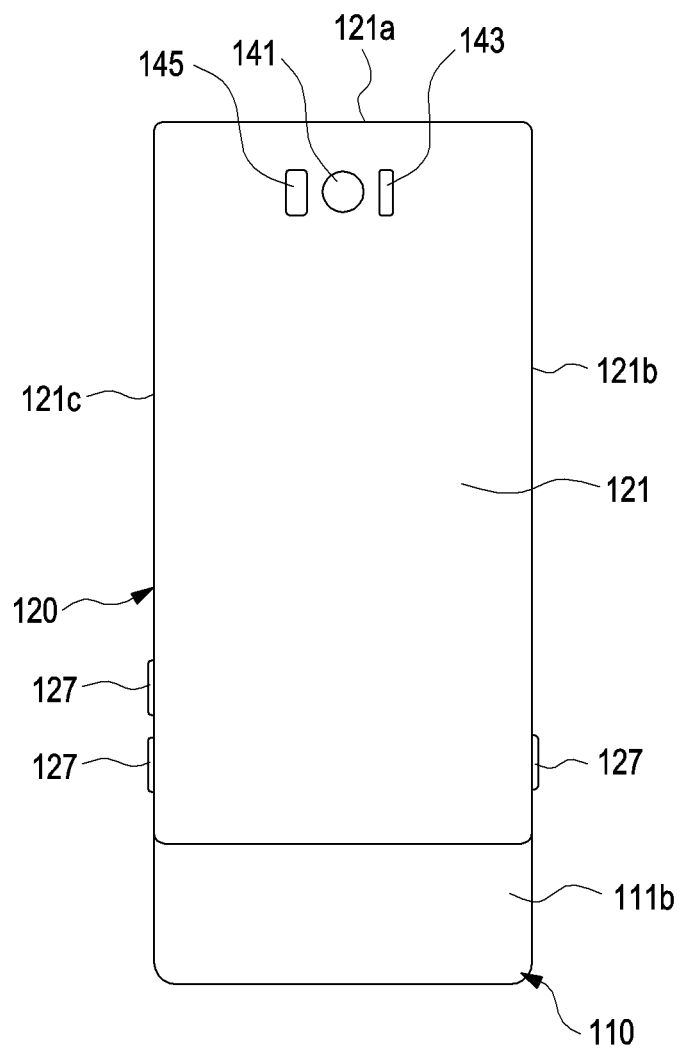
FIG. 3 illustrates a rear face of an electronic device according to an embodiment.

FIG. 3 illustrates a rear face of an electronic device according to an embodiment.

Referring to FIGS. 1, 2, and 3, an electronic device includes the first structure 110 and the second structure 120 movably disposed on the first structure 110. The first structure 110 is reciprocable by a predetermined distance d1 in the illustrated direction with reference to the second structure 120.

A first plate 111 of the first structure 110 includes a first face 111*a* and a second face 111*b* opposite the first face 111*a*. The second structure 120 includes a second plate 121, a first sidewall 121*a* extending from the second plate 121, a second sidewall 121*b* extending from the second plate 121, and a third sidewall 121*c* extending from the first sidewall 121*a* and the second plate 121 and parallel to the second sidewall 121*b*. The second plate 121, the first sidewall 121*a*, the second sidewall 121*b*, and the third sidewall 121*c* may be formed to open at one side, to accommodate at least a part of the first structure 110. A portion of the first structure 110 or a portion of a display 112 included in the first structure 110 may be exposed through a region, which opens in the first face of the second structure 120. Alternatively, the second sidewall 121*b* or the third sidewall 121*c* may be omitted. The second plate 121, the first sidewall 121*a*, the second sidewall 121*b*, or the third sidewall 121*c* may be formed as an integrated structure, or the second plate 121, the first sidewall 121*a*, the second sidewall 121*b*, or the third sidewall 121*c* may be formed as separate structures and may be then coupled to each other.

The first structure 110 is movable to the open state or the closed state relative to the second structure 120 in a first direction (e.g., the direction indicated by a down arrow in FIG. 2) parallel to the second plate 121 and the second sidewall 121b, such that a bottom edge of the first structure 110 may be located at a first distance from the first sidewall 121a in the closed state and may be located at a second distance, i.e., farther, from the first sidewall 121a in the open state. For example, the first structure 110 rectilinearly reciprocates by "d1" in relation to the second structure 120, and provides an expanded area (EA) of the screen display region in the open state.

The electronic device includes the display 112, audio modules 123 and 125, a camera module, an indicator (e.g., an LED device), a sensor module, a key input device 127, and/or connector holes 131 and 132. The arrangement positions of the above-mentioned components may be changed depending on the appearance, use environment, operating mode (e.g., the slide movement direction of the first structure 110) of the electronic device, an arrangement environment of various electronic components in the electronic device, etc.

The display 112 includes a planar portion 112a on the first face 111a, and a bendable portion extending from the planar portion 112a into a space between the first sidewall 121a and the first structure 110 in the closed state. When viewed from above the first plate 111, at least a part of the bendable portion of the display 112 may be configured to be moved (or to be exposed) by a predetermined display region EA toward the planar portion 112a in order to dispose a substantially planar face between the planar portion 112a and the first sidewall 121a when the first structure 110 is moved from the closed state to the open state. The display 112 may be coupled to or disposed adjacent to a touch-sensing circuit, a pressure sensor capable of measuring touch intensity (pressure), and/or a digitizer that detects a magnetic field-type stylus pen.

The audio modules 123 and 125 may include a speaker hole 123 or a microphone hole 125. The speaker hole 123 may include a receiver hole or an external speaker hole 123. The microphone hole 125 may include a microphone disposed therein for acquiring external sound. The microphone hole 125 may include multiple microphones disposed therein, that sense the direction of sound. Alternatively, the speaker hole 123 and the microphone hole 125 may be implemented as a single hole, or a speaker may be included without a speaker hole 123 (e.g., a piezoelectric speaker).

A receiver hole may be disposed in the first structure 110 or the second structure 120, and the external speaker hole 123 or the microphone hole 125 may be disposed in the second structure 120. The speaker hole 123 may be disposed in the second face 111b of the first plate 111 or in a side face of the first structure 110. The microphone hole 125 may be disposed in a side face of the first structure 110.

A sensor module may generate an electrical signal or a data value corresponding to the internal operating state or the external environmental state of the electronic device. The sensor module may include a proximity sensor disposed on the first face 111a of the first plate 111 or on the second structure 120 and/or an electronic component (e.g., an image sensor 141 or a fingerprint sensor 145) disposed on the second face 111b side of the first plate 111.

The sensor module may include a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, and/or an illuminance sensor.

Camera modules may include a first camera device (e.g., a selfie-camera) disposed on the first face 111a of the first plate 111 and a second camera device (e.g., the image sensor 141) disposed on the outer face of the second plate 121. The first camera device or the second camera device may include one or more lenses, an image sensor, and/or an image signal processor. The second camera device may be disposed on one face (e.g., the rear face) of the second structure 120.

The key input device 127 may be disposed on the second sidewall 121b or the third sidewall 121c of the second structure 120. The electronic device may include a key input device, such as a home key button or touch pads disposed around the home key button. At least a part of the key input device 127 may be located in a region of the first structure 110.

An indicator may be disposed on the first face 111a of the first plate 111 (e.g., in an active region or an inactive region of the display 112). The indicator may include an LED that provides state information of the electronic device in an optical form.

The connector holes 131 and 132 include a first connector hole 131 capable of accommodating a connector (e.g., a universal serial bus (USB) connector) for transmitting/receiving power and/or data to/from an external electronic device, and a second connector hole 132 capable of accommodating a connector (e.g., an earphone jack) for transmitting/receiving an audio signal to/from an external electronic device. The first connector hole 131 or the second connector hole 132 may be disposed in the first sidewall 121a of the second structure 120. The first connector hole 131 or the second connector hole 132 may be disposed in a sidewall of the first structure 110.

Referring to FIG. 3, the electronic device includes a plurality of components exposed to the outer face of the second plate 121 (e.g., the second face 120 of the second structure 120), such as the image sensor 141, a light-emitting element 143, and the fingerprint sensor 145. The components, such as the image sensor 141, may be accommodated inside the second structure 120 so as to be isolated from the external environment, but external light may be incident thereon through a transparent window or the like. The light-emitting element 143 emits light, and the fingerprint sensor 145 acquires a fingerprint image or the like from a user.

Figure 4:
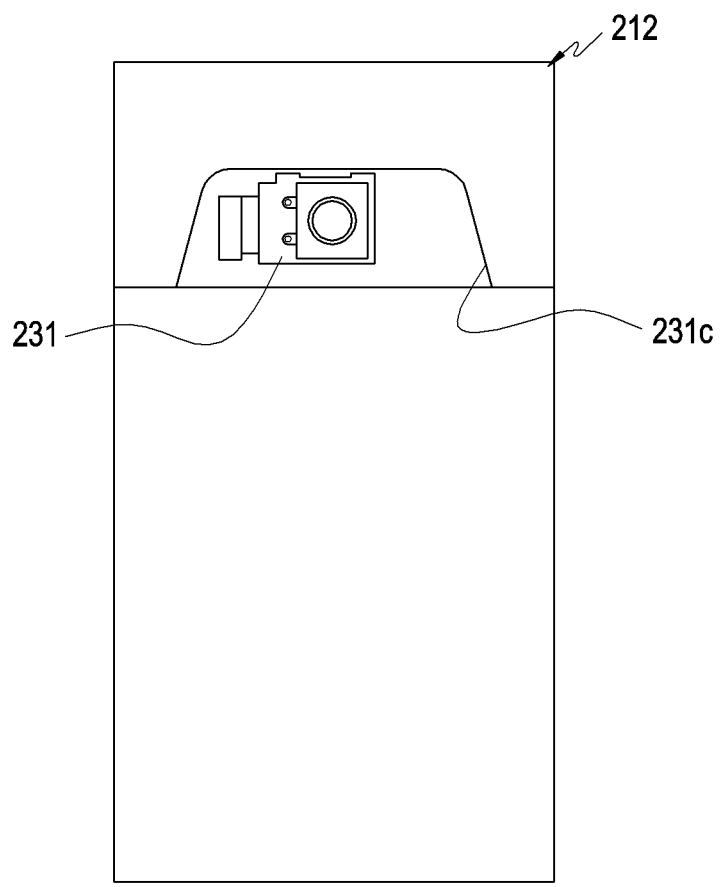
FIG. 4 illustrates an arrangement state of a flexible display in an electronic device according to an embodiment.

FIG. 4 illustrates an arrangement state of a flexible display in an electronic device according to an embodiment.

Figure 5:
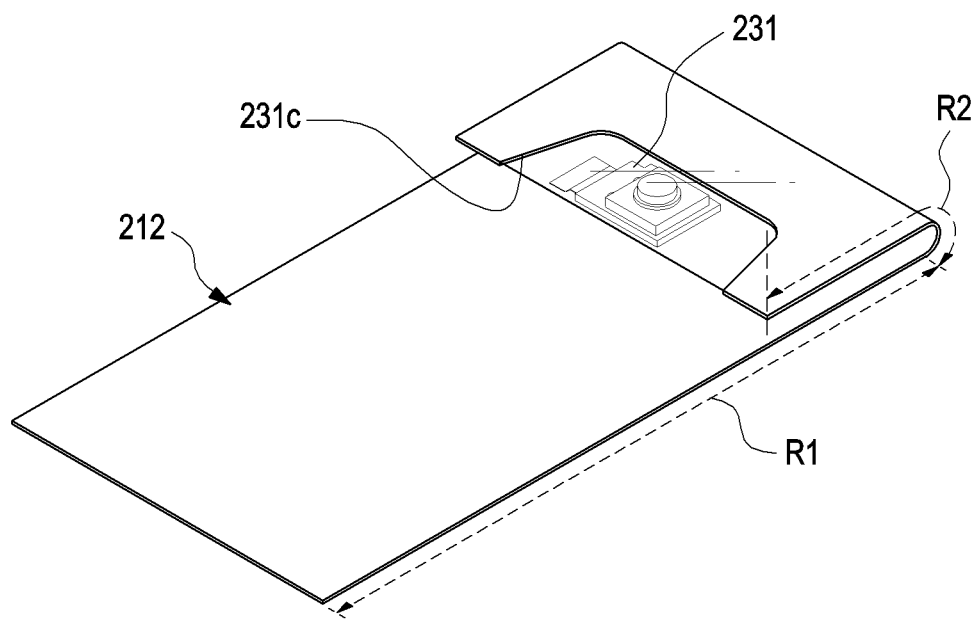
FIG. 5 illustrates an arrangement state of a flexible display in an electronic device according to an embodiment.

FIG. 5 illustrates an arrangement state of a flexible display in an electronic device according to an embodiment.

Referring to FIGS. 4 and 5, an electronic device includes a flexible display 212 mounted on a first structure and a first electronic component 231 (e.g., an image sensor) embedded in a second structure. At least a part of the flexible display 212 may be selectively accommodated in the second structure or to be selectively exposed to the outside of the second structure.

The flexible display 212 includes a first region or a first section designated by reference numeral "R1", which is mounted on the first structure, and a second region or a second section designated by reference numeral "R2", which is accommodated in the second structure and exposed to the outside, when the first structure and the second structure move (e.g., slide) relative to each other.

In the open state, the electronic device outputs an enlarged screen, e.g., EA in FIG. 2. For example, the electronic device is able to output a screen of a 16:9 aspect ratio in the closed state (FIG. 1), and is able to output a screen of an 18:9 aspect ratio in the open state (FIG. 2).

A portion of the second region R2 may be located substantially parallel to a portion of the first region R1 while accommodated within the second structure.

A region (e.g., another portion of the second region R2) that connects a portion of the second region R2 and a portion of the first region R1, which are positioned parallel to each other, may be maintained in a curved shape. For example, a portion of the second region R2 that is exposed to the outside may be positioned substantially in the same plane as the first region R1, and a section of the second region R2 may be deformed into a curved shape while being inserted into the second structure.

The flexible display 212 includes a cutout portion 231c, such as a U-cut region, formed in the second region R2. When a portion of the flexible display 212 (e.g., the second region R2) is accommodated in the second structure, the first electronic component 231 may be located or accommodated in the region in which the cutout portion 231c is provided. Referring to FIG. 4, the cutout portion 231c has a slot or recess shape extending inwardly from one side edge of the flexible display 212 to form an approximate letter U shape. For example, the cutout portion 231c may be formed have a slot or recess shape extending from one side edge of the flexible display 212 in the slide movement direction or trace of the first structure or the second structure.

The flexible display 212 may also include a window and a display panel (e.g., a light-emitting layer), and may be capable of transmitting light of the display panel at least in a region corresponding to the cutout portion 231c. For example, a window of the flexible display 212 may exist in the region formed by the cutout portion 231c, and the window of the flexible display 212 may allow light to be incident on the first electronic component 231 while isolating the space in which the first electronic component 231 is disposed (the inner space of the second structure) from the external environment. Alternatively, at least a portion of the cutout portion 231c (e.g., a transparent region) may be disposed to substantially overlap the region in which the first electronic component 231 is disposed, while the second region R2 is exposed to the outside. For example, while the second region R2 is exposed to the outside, at least the cutout portion 231c may allow light to be incident on the first electronic component 231 while isolating the space in which the first electronic component 231 is disposed from the external environment.

Herein, the cutout portion 231c refers to a region allowing light to be incident, and the shape of the cutout portion 231c is not necessarily limited to the U-shaped slot or recess formed by mechanically or partially removing the flexible display 212. For example, the cutout portion 231c may visually expose the first electronic component 231 to the outside, but may isolate the first electronic component 231 from the external environment.

When at least a part of the flexible display 212 is accommodated inside the second structure, the cutout portion 231c may include a region(s) overlapping the first electronic component 231. The overlapping region may be formed substantially along a trace along which the first electronic component 231 moves in relation to the flexible display 212 when the flexible display 212 moves (e.g., in the process of being accommodated in the second structure or moving to a position exposed to the outside). The cutout portion 231c may be formed to be substantially the same as the overlapping region(s) or wider than the overlapping region(s) to include the overlapping region(s).

Figure 6:
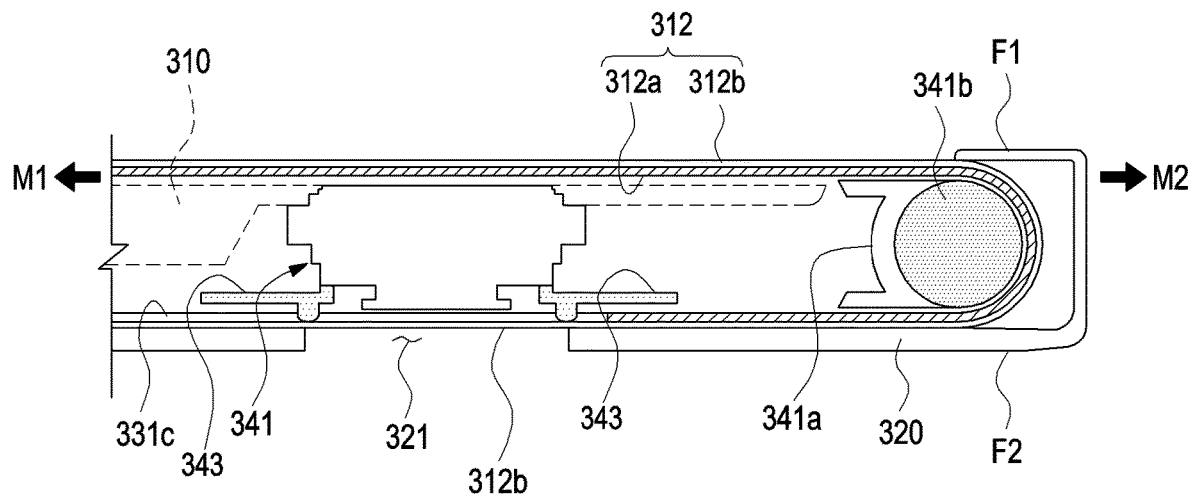
FIG. 6 illustrates an arrangement state of a flexible display in an electronic device according to an embodiment.
Figure 7:
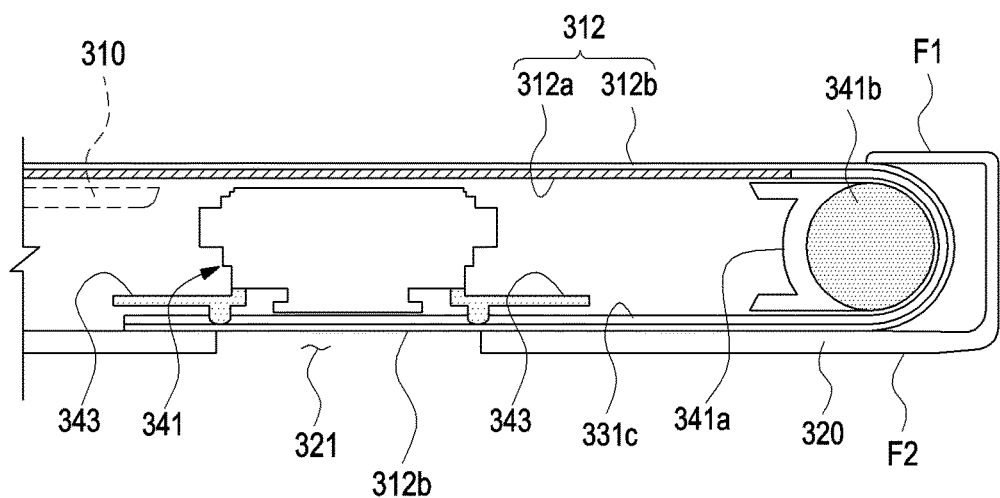
FIG. 7 illustrates an arrangement state in which a flexible display is extracted from an electronic device according to an embodiment.

FIG. 6 illustrates an arrangement state of a flexible display in an electronic device according to an embodiment. FIG. 7 illustrates an arrangement state, in which a flexible display is extracted from an electronic device according to an embodiment.

Specifically, FIG. 6 illustrates the closed (or partially open) state of a first structure 310 in relation to a second structure 320, and FIG. 7 illustrates the open state of the first structure 310 in relation to the second structure 320.

Referring to FIGS. 6 and 7, the electronic device includes the first structure 310 and the second structure 320 that are slidably coupled to each other. For example, in the closed state, the first structure 310 is slidable in a direction "M1" in relation to the second structure 320, and the second structure 320 is slidable in a direction "M2" in relation to the first structure 310. The flexible display 312 may include a first region (e.g., the first region R1 as illustrated in FIG. 5) mounted on the first structure 310 and a second region (e.g., the second region R2 as illustrated in FIG. 5) extending from the first region R1. As the first structure 310 slides relative to the second structure 320, the second region of the flexible display 312 may be accommodated in the second structure 320 or may be exposed to the outside of the second structure 320.

A portion of the flexible display 312 may be exposed on a first face F1 of the second structure 320, and a region accommodated inside the second structure 320 may be positioned substantially adjacent to a second surface F2 of the second structure 320.

Within the second structure 320, a first electronic component 341, such as an image sensor, a light emitting element, or a fingerprint sensor, may be disposed. The first electronic component 341 may be coupled to a support member 343 (e.g., via sponge, double-sided tape, or the like) and may be mounted or fixed within the second structure 320 through the support member 343. The first electronic component 341, such as an image sensor, may detect external light through an imaging aperture 321 formed through the second face F2. The flexible display 312 seals the imaging aperture 321 to isolate the inner space of the second structure 320 from the outer space, but is able to allow light to pass therethrough. For example, a portion of the flexible display 312 may be disposed between the second face F2 and the first electronic component 341 to allow light to pass therethrough, while isolating the outer space from the space in which the first electronic component 341 is disposed.

The flexible display 312 includes a display panel 312a (e.g., a light-emitting layer) and a window 312b (e.g., a window film). The window 312b may be laminated on the outer face of the display panel 312a to protect the display panel 312a from the external environment. The window 312b may be a flexible transparent layer or film, and is able to transmit light substantially without loss. The window 312b may transmit a screen output from the display panel 312a to the outside. For example, the window 312b may be made of a synthetic resin material selected from polyimide, polycarbonate, polyether sulfone, polyethylene terephthalate, polyethylene naphthalate, polyacrylate, and fiber-reinforced plastic, and may be manufactured to have a thickness of 0.05 mm to 0.2 mm, for example, 0.15 mm or less to be deformed into a curved shape together with the display panel 312a.

The display panel 312a may include a pixel layer or a light-emitting layer using an OLED. The OLED may be manufactured to have a considerably thin thickness while maintaining screen display performance. For example, the display panel 312a is to be freely deformable in a curved shape in a range in which a certain radius of curvature is ensured together with the window 312b.

The display panel 312a includes a cutout portion 331c, which may have a higher light transmittance than other regions of the display panel 312a in a portion of the light-emitting layer forming the display panel 312a, by not applying an organic luminescent material to the portion or lowering the concentration of the organic luminescent material in the portion. A transparent synthetic resin may be applied to the cutout portion 331c to keep the thickness of the flexible display 312 in the cutout portion 331c to be the same as the thickness of the flexible display 312 in other regions.

The cutout portion 331c may extend from one end of the flexible display 312 along the direction (or movement trajectory) in which the first structure 310 or the second structure 320 slides. For example, within the second structure 320, the cutout portion 331c may extend in the direction "M2" from the end of the flexible display 312. The cutout portion 331c may be formed by removing a portion of the display panel 312a. For example, in a region corresponding to the cutout portion 331c, a portion of the window 312b of the flexible display 312 may be disposed, but the display panel 312a may not be disposed. In the flexible display 312, the window 312b may be disposed between the second face F2 and the first electronic component 341, while the display panel is not be disposed between the second face F2 and the first electronic component 341. If the display panel 312a is not disposed between the second face F2 and the first electronic component 341, the cutout portion 331c may substantially accommodate a portion of the first electronic component 341.

A portion of the display panel 312a may be removed to form the cutout portion 331c, and a portion of the first electronic component 341 may be received in the cutout portion 331c, so that the thickness of the device 300 can be reduced.

The window 312b may also be located in the region corresponding to the cutout portion 331c, and when the electronic device 300 is in the open state, at least a portion of the flexible display 312 may be positioned between the second face F2 and the first electronic component 341. For example, regardless of the sliding movement of the first structure 310, the flexible display 312 may seal the imaging aperture 321, and the first electronic Component 341 may be maintained in the state of being isolated from the outer space. The first electronic component 341 may detect at least a part of information of light incident through a portion of the flexible display 312 (e.g., a portion aligned with the imaging aperture 321).

The electronic device further includes a guide base 341a and a guide roller(s) 341b. The guide base 341a or the guide roller 341b is able to maintain the radius of curvature of the flexible display 312 at a predetermined level when the flexible display 312 is deformed into a curved shape. For example, the flexible display 312 may be stored inside the second structure 320 or may be extracted to the outside while at least partially wrapping the guide base 341a or the guide roller 341b. The guide base 341a or the guide roller 341b is able to maintain the radius of curvature of the flexible display 312 (e.g., the portion deformed in the curved shape) at several mm or more (e.g., 2 to 3 mm, or more) while the flexible display 312 is accommodated inside of the second structure 320 or is extracted outside of the second structure 320.

Figure 8:
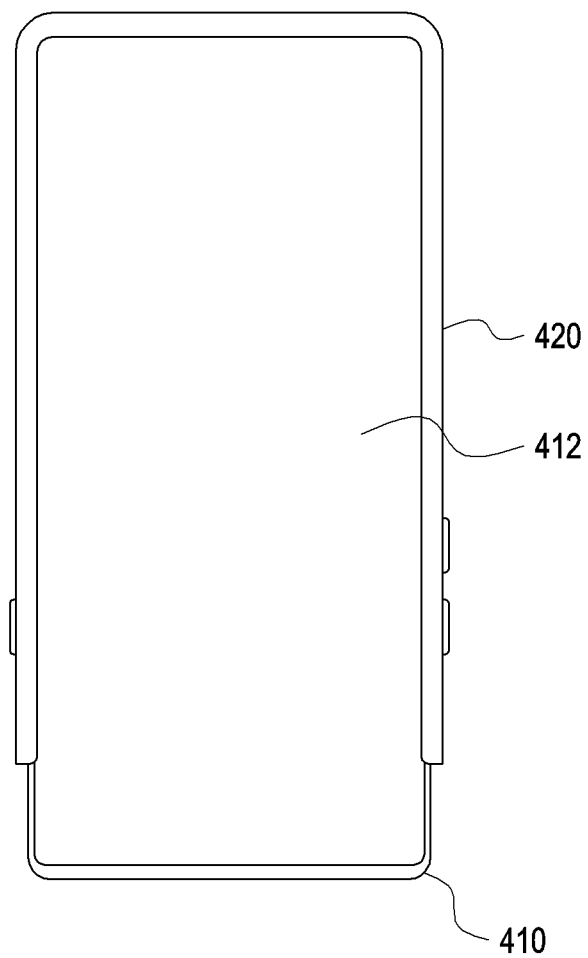
FIG. 8 illustrates a closed state of an electronic device according to an embodiment.
Figure 9:
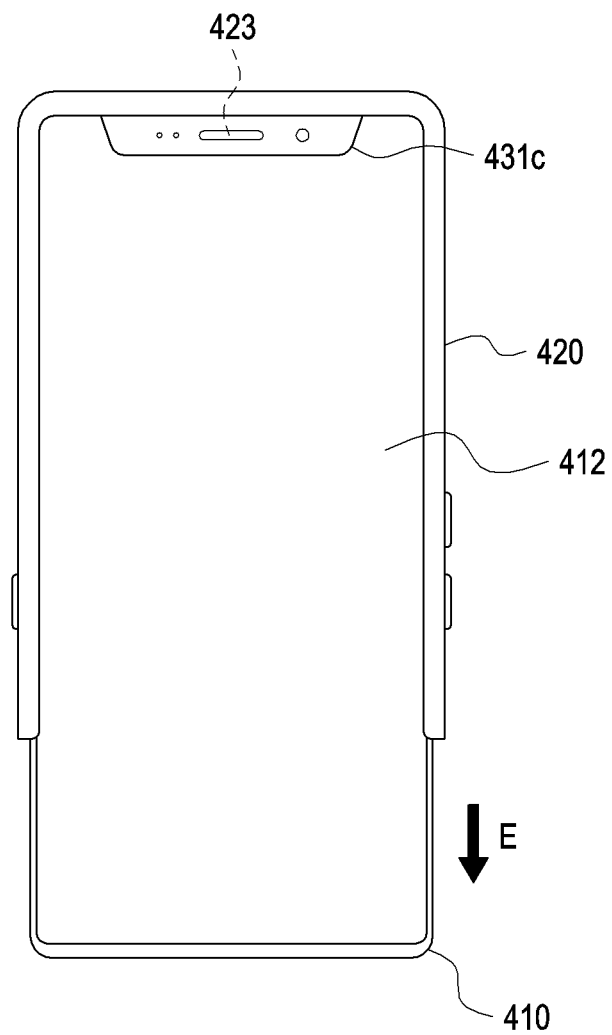
FIG. 9 illustrates an open state of an electronic device according to an embodiment.

FIG. 8 illustrates a closed state of an electronic device according to an embodiment. FIG. 9 illustrates an open state of an electronic device according to an embodiment.

Referring to FIGS. 8 and 9, the screen display region of the display 412 may be expanded or contracted, depending on the sliding movement of the first structure 410. For example, a portion of the display 412 may be accommodated in the second structure 420 or may be exposed. The display 412 includes a cutout portion 431c, which may be substantially transparent.

When the screen display region of the display 412 is expanded, e.g., when the first structure 410 has slid in the direction indicated by arrow E as illustrated in FIG. 9, a portion of the cutout portion 431c may be exposed, and the internal structure of the electronic device 400 may be visually exposed through the cutout portion 431c. At least one second electronic component 423 may be disposed in a region selectively exposed through the cutout portion 431c (e.g., an internal structure of the electronic device). The second electronic component 423 may include an acoustic component, such as a piezoelectric speaker, that outputs multimedia sound, received sound, etc.

Although not illustrated, when the screen display region of the display 412 is reduced, e.g., as illustrated in FIG. 8, a portion of the cutout portion 431c may still be exposed. For example, the extent to which the incision 431c is exposed may vary depending on the contraction or expansion state of the display 412. The degree of exposure of the cutout portion 431c depending on the contraction or expansion state of the display 412 may be appropriately set in consideration of the sliding movement range (or the movement distance) of the first structure 410, the external appearance (or aesthetic sense) of the electronic device 400 according to the exposure of the cutout portion 431 when the display 412 is contracted or expanded.

Figure 10:
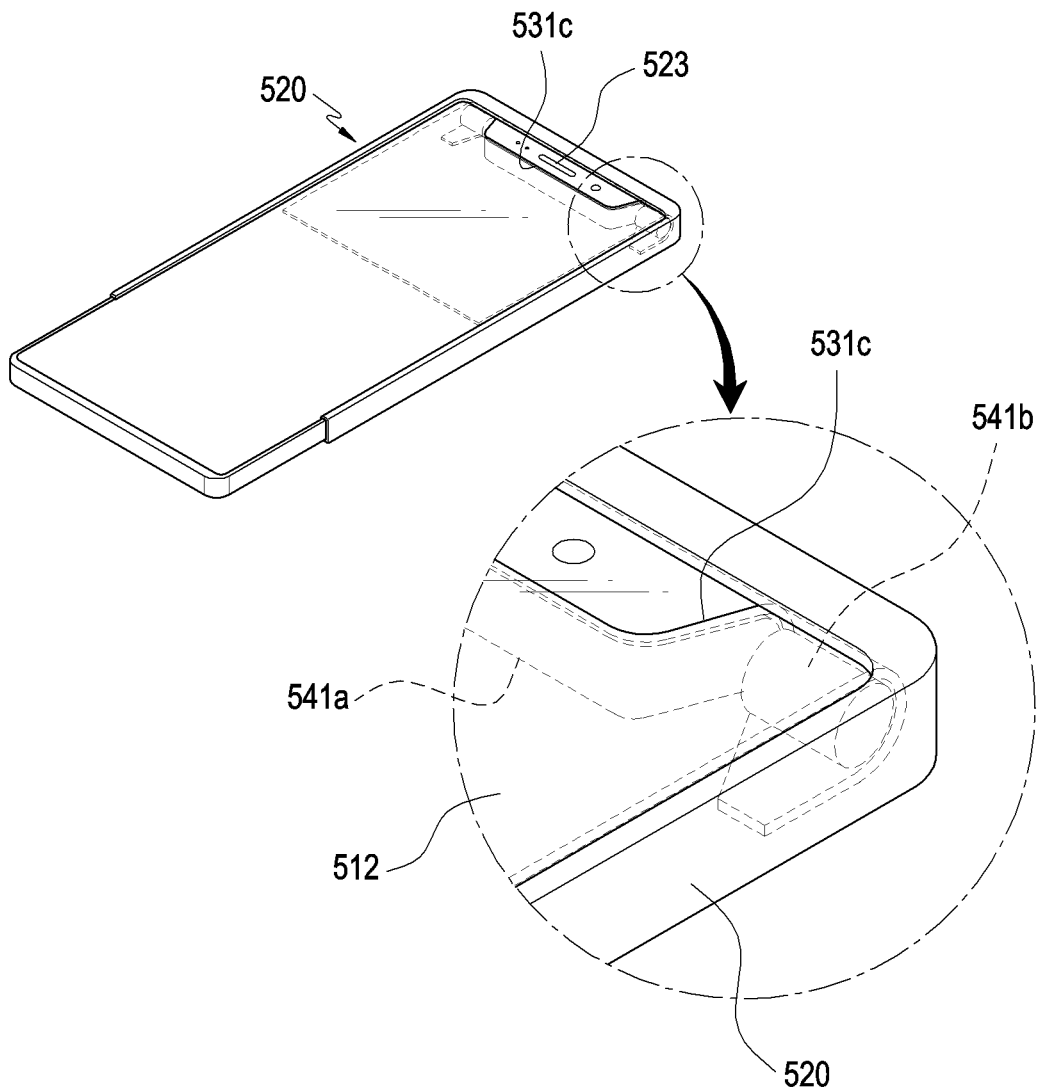
FIG. 10 illustrates an electronic device according to an embodiment.
Figure 11:
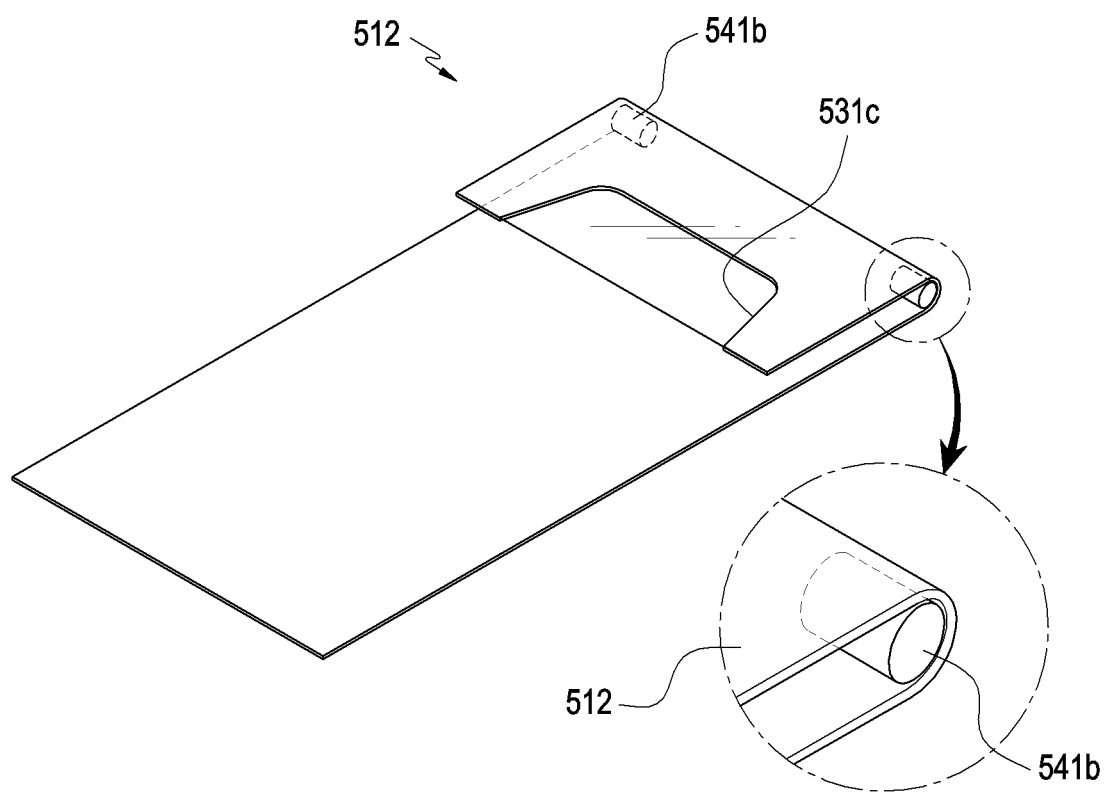
FIG. 11 illustrates an arrangement state of a flexible display in an electronic device according an embodiment.

FIG. 10 illustrates an electronic device according an embodiment. FIG. 11 illustrates an arrangement state of a flexible display in an electronic device according to an embodiment.

Referring to FIGS. 10 and 11, the electronic device includes a first structure 510 and a second structure 520, which encloses at least a portion of the first structure 510. The second structure 520 may slidably guide the first structure 510. The electronic device further includes a flexible display 512 installed on the first structure 510, and a portion of the display 512 may be accommodated in the second structure 520 or exposed, depending on the sliding movement of the first structure 510.

More specifically, FIG. 10 illustrates a state in which most of the display 512 is exposed (e.g., a state in which a part of the cutout portion 531c is exposed), and FIG. 11 illustrates a state in which a portion of the display 512 is accommodated in the second structure 520.

The electronic device 500 further includes a guide base 541a and a guide roller 541b, which are configured to guide or induce the deformation of the display 512 in the curved shape when the display 512 is accommodated inside of the second structure 520 or moved to a position outside of the second structure 520. For example, the display 512 may be movable through a space between the inner wall of the second structure 520 and the guide base 541a (or the guide roller 541b) while at least partially wrapping the guide base 541a or the guide roller 541b, and the guide base 541a and the guide roller 541b may maintain the curvature radius of the display 512 at a predetermined size or more. The guide roller 541b may be provided at each end of the guide base 541a, and may be rotatably mounted within the second structure 520.

An electronic component 523, such as a sound component (e.g., a piezoelectric speaker), may be disposed on the guide base 541*a*. When the display 512 is expanded, a portion of the cutout portion 531*c* may be exposed in a portion of the second structure 520 (e.g., the upper end portion of the second structure 520 in FIG. 10). If the cutout portion 531*c* is formed to be substantially transparent, the electronic component 523 may be visually exposed to the outside through the cutout portion 531*c* when the display 512 is expanded. The electronic component 523 may be protected from the external environment by the display 512, even though the electronic component 523 is visually exposed, e.g., through a window.

Figure 12:
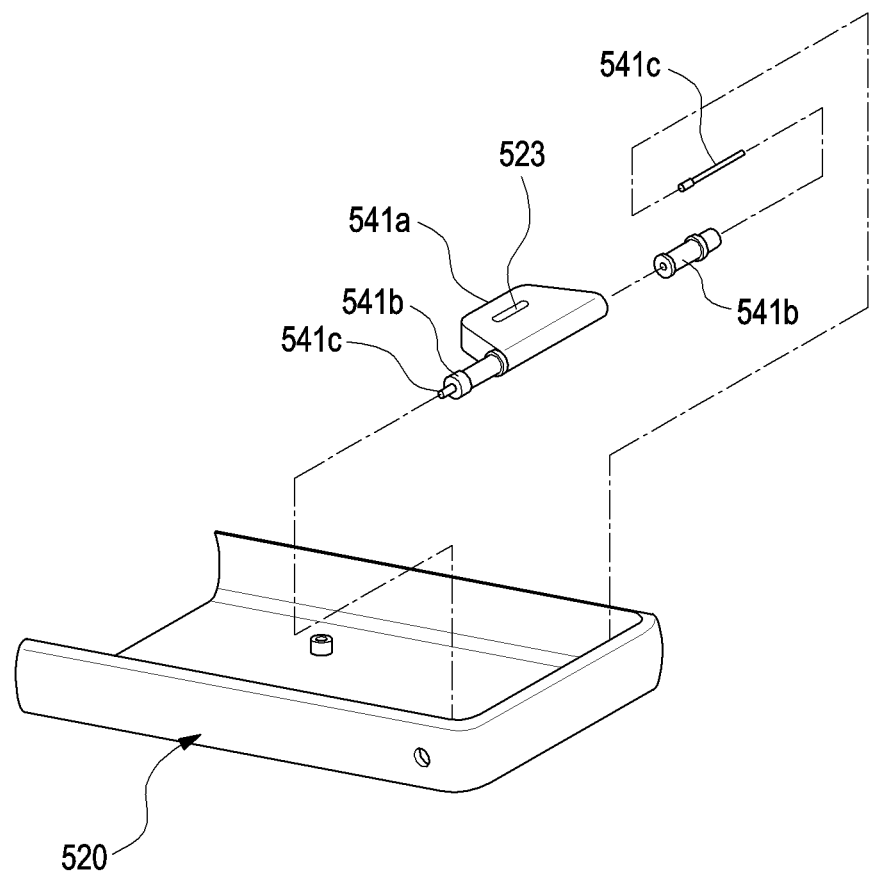
FIG. 12 illustrates a guide structure of an electronic device according to an embodiment.

FIG. 12 illustrates a guide structure of an electronic device according an embodiment.

Referring to FIG. 12, the guide roller 541*b* is rotatably coupled to each end of the guide base 541*a* by a guide pin 541*c*. The guide pin 541*c* is provided at each end of the guide base 541*a*. One end of the guide pin 541*c* may be connected to the guide base 541*a*, and the other end may be connected to the inner wall of the second structure 541*b*. For example, the guide pin 541*a* may be fixed to each of the inner walls of the second structure 520 facing each other, and the guide base 541*a* may be fixed to the inner wall of the second structure 520 through the guide pin(s) 541*c*. The guide pin 541*c* may be disposed through the guide roller 541*b* substantially to support the guide roller 541*b* in a rotatable state. One guide pin (e.g., the guide pin 541*c*) may be provided in the inside of the second structure 520. The guide pin 541*c* may be coupled to sequentially pass through the guide roller 541*b*, the guide base 541*a* on one side, and/or the guide roller 541*b* on the other side, and the opposite ends of the guide pin 541*c* may be mounted and fixed to the inner walls of the second structure 520, respectively.

A section of the guide pin 541*c*, in which the guide roller(s) 541*b* is disposed or coupled, may be formed in a substantially circular cross-sectional shape, and a section of the one guide pin 541*c*, in which the guide roller is coupled to the guide base 541*a*, may be formed in a substantially polygonal cross-sectional shape. For example, the guide base 541*a* may be non-rotatably coupled to the guide pin 541*c*, and the guide roller(s) 541*b* may be rotatably coupled to the guide pin 541*c*.

As described above, an electronic device according to an embodiment may include a first structure including a first face and a second face opposite the first face; a second structure coupled to enclose at least a part of the first structure, and configured to guide a sliding movement of the first structure in a direction parallel to the first face or the second face of the first structure; a flexible display having a first region mounted on the first face of the first structure and a second region, which does not overlap the first region, the second region being accommodated in the second structure or exposed to a first face of the second structure in an upper end portion of the second structure, depending on the sliding movement of the first structure; and a first electronic component inside the second structure and exposed in a second face of the second structure, which is opposite the first face of the second structure. Within the second structure, a portion of the flexible display (hereinafter, referred to as an "overlapping region"), e.g., a cutout portion, may be disposed to overlap a region in which the first electronic component is disposed.

The first electronic component may include an optical sensor.

The first electronic component may include an image sensor or a light-emitting element.

The first electronic component may include an optical sensor, and the overlapping region may transmit light.

The overlapping region may be positioned between the first electronic component and the second face of the second structure.

The overlapping region may be disposed along a rectilinear trace extending from a portion of the second region.

The first electronic component may include an optical sensor, and the overlapping region may transmit light.

As the first structure slides, a portion of the overlapping region may be selectively exposed in the upper end portion of the second structure.

The electronic device may further include a second electronic component inside the second structure, and the second electronic component may be selectively exposed in the first face of the second structure through a portion of the overlapping region.

The second electronic component may include a sound component.

The second electronic component may include a piezoelectric speaker.

The electronic device may further include a guide base disposed in an upper end portion inside the second structure, and guide rollers provided at opposite ends of the guide base. The second region of the flexible display may be inserted into the second structure or may be extracted to the outside of the second structure while wrapping at least a part of the guide base and the guide rollers.

The electronic device may further include a second electronic component mounted on the guide base.

The second electronic component may be selectively exposed in the first face of the second structure through a portion of the overlapping region.

The flexible display may include a cutout portion or a U-cut region corresponding to at least a part of a region in which the second electronic component is installed while being accommodated in the second structure.

An electronic device according to an embodiment may include a first structure including a first face and a second face opposite the first face; a second structure that encloses at least a part of the first structure to at least partially accommodate the first structure therein, and configured to guide a sliding movement of the first structure in a direction parallel to the first face or the second face of the first structure; a flexible display having a first region on the first face of the first structure and a second region, different from the first region, the second region being inserted into or accommodated in the second structure or exposed to a first face of the second structure in an upper end portion of the second structure, depending on the sliding movement of the first structure; and an image sensor mounted inside the second structure and exposed to the outside in a second face of the second structure, which faces away from the first face of the second structure. An overlapping region of the flexible display may be disposed between the image sensor and the second face of the second structure.

The overlapping region may transmit light incident from the second face of the second structure toward the image sensor.

The overlapping region may extend along a rectilinear trace in a portion of the second region, and as the first structure slides, a portion of the overlapping region may be selectively exposed in the upper end portion of the second structure.

The electronic device may further include a guide base disposed in an upper end portion inside the second structure, guide pins extending from opposite ends of the guide base in directions away from each other, and guide rollers rotatably coupled to the guide pins, respectively.

The second region of the flexible display may be inserted into the second structure or may be extracted to the outside of the second structure in the state of wrapping at least a part of the guide base and the guide rollers.

The end portions of the guide pins are supported on the inner walls of the second structure to fix the guide base in the second structure.

As described above, using an electronic device according to an embodiment of the disclosure, it is possible to accommodate at least a portion of the flexible display in the electronic device, and to expand and expose the screen display region according to a user's need. Thus, the electronic device is easy and convenient to carry, but is still able to provide a wide screen. While being accommodated in or extracted from the electronic device, the flexible display can be disposed to avoid mechanical interference with any other structures (e.g., electronic components, such as an optical sensor), so that the flexible display can be easily installed in the electronic device. Because the flexible display is able to at least partially transmit light, it is also possible to provide a stable operating environment for the optical sensor, even if the flexible display is disposed over an electronic component, such as an optical sensor.

While the present disclosure has been shown and described with reference to certain embodiments thereof, it will be understood by those skilled in the art that various changes in form and details may be made therein without departing from the spirit and scope of the disclosure as defined by the appended claims.

What is claimed is:

1. An electronic device comprising:
a first structure including a first face facing a first direction and a second face facing a second direction opposite to the first direction;
a second structure that encloses at least a part of the first structure, and configured to guide a sliding movement of the first structure in a direction parallel to the first face or the second face of the first structure;
a flexible display including a first region mounted on the first face of the first structure and a second region, which is different from the first region, the second region configured to be accommodated in the second structure or exposed to a first face of the second structure depending on the sliding movement of the first structure; and
a first electronic component inside the second structure and exposed through a second face of the second structure, the second face of the second structure facing the second direction and facing away from a first face of the second structure,
wherein the flexible display includes an overlapping region at a portion of the flexible display that overlaps a region in which the first electronic component is disposed.

2. The electronic device of claim 1, wherein the first electronic component includes an optical sensor.

3. The electronic device of claim 1, wherein the first electronic component includes an image sensor or a light-emitting element.

4. The electronic device of claim 1, wherein the first electronic component includes an optical sensor, and wherein the overlapping region is configured to transmit light.

5. The electronic device of claim 1, wherein the overlapping region is positioned between the first electronic component and the second face of the second structure.

6. The electronic device of claim 1, wherein the overlapping region is disposed along a rectilinear trace extending in a portion of the second region.

7. The electronic device of claim 6, wherein the first electronic component includes an optical sensor, and
wherein the overlapping region is configured to transmit light.

8. The electronic device of claim 6, wherein a portion of the overlapping region is configured to be selectively exposed in an upper end portion of the second structure, as the first structure slides.

9. The electronic device of claim 8, further comprising a second electronic component inside the second structure,
wherein the second electronic component is configured to be selectively exposed through the first face of the second structure through the portion of the overlapping region.

10. The electronic device of claim 9, wherein the second electronic component includes a sound component.

11. The electronic device of claim 9, wherein the second electronic component includes a piezoelectric speaker.

12. The electronic device of claim 1, further comprising:
a guide base disposed in an upper end portion inside the second structure; and
guide rollers provided at opposite ends of the guide base,
wherein the second region of the flexible display is configured to be inserted into the second structure or extracted outside of the second structure while wrapping at least a part of the guide base and the guide rollers.

13. The electronic device of claim 12, further comprising a second electronic component mounted on the guide base.

14. The electronic device of claim 13, wherein the second electronic component is configured to be selectively exposed in the first face of the second structure through a portion of the overlapping region.

15. The electronic device of claim 1, wherein the flexible display includes a cutout portion or a U-cut region corresponding to at least a part of the region in which the first electronic component is installed while being accommodated in the second structure.

16. An electronic device comprising:
a first structure including a first face and a second face facing opposite to the first face;
a second structure that encloses at least a part of the first structure to at least partially accommodate the first structure therein, and configured to guide a sliding movement of the first structure in a direction parallel to the first face or the second face of the first structure;
a flexible display including a first region mounted on the first face of the first structure and a second region, which is different from the first region, the second region configured to be accommodated in the second structure or exposed through a first face of the second structure, depending on the slide movement of the first structure; and
an image sensor inside the second structure and exposed through a second face of the second structure, the second face of the second structure facing away from a first face of the second structure,
wherein the flexible display includes an overlapping region at a portion of the flexible display that is disposed between the image sensor and the second face of the second structure.

17. The electronic device of claim 16, wherein the overlapping region is configured to transmit light incident from the second face of the second structure toward the image sensor.

18. The electronic device of claim 16, wherein the overlapping region extends along a rectilinear trace in a portion of the second region, and a portion of the overlapping region is configured to be selectively exposed in an upper end portion of the second structure as the first structure slides.

19. The electronic device of claim 16, further comprising:
- a guide base disposed in an upper end portion inside the second structure;
- guide pins extending from opposite ends of the guide base in directions away from each other, and
- guide rollers rotatably coupled to the guide pins,
- wherein the second region of the flexible display is configured to be inserted into the second structure or extracted outside of the second structure while wrapping at least a part of the guide base and the guide rollers.

20. The electronic device of claim 19, wherein end portions of the guide pins are supported on inner walls of the second structure to fix the guide base in the second structure.

* * * * *